(12) United States Patent
Morinaga et al.

(10) Patent No.: US 9,171,388 B2
(45) Date of Patent: Oct. 27, 2015

(54) OBJECT DISPLAY DEVICE AND OBJECT DISPLAY METHOD

(75) Inventors: Yasuo Morinaga, Chiyoda-ku (JP); Manabu Ota, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 217 days.

(21) Appl. No.: 13/879,701

(22) PCT Filed: Oct. 13, 2011

(86) PCT No.: PCT/JP2011/073549
§ 371 (c)(1),
(2), (4) Date: Apr. 16, 2013

(87) PCT Pub. No.: WO2012/063593
PCT Pub. Date: May 18, 2012

(65) Prior Publication Data
US 2013/0201217 A1    Aug. 8, 2013

(30) Foreign Application Priority Data
Nov. 8, 2010  (JP) .................................. 2010-249869

(51) Int. Cl.
G09G 5/00   (2006.01)
G06T 11/60  (2006.01)
G06T 19/00  (2011.01)
G06F 3/0481 (2013.01)
G06T 11/00  (2006.01)

(52) U.S. Cl.
CPC ............ *G06T 11/60* (2013.01); *G06F 3/04815* (2013.01); *G06T 11/00* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 2005/0234333 A1* | 10/2005 | Takemoto et al. | 600/426 |
| 2005/0264555 A1* | 12/2005 | Zhou et al. | 345/419 |
| 2009/0203445 A1* | 8/2009 | Dohta et al. | 463/39 |
| 2011/0084893 A1* | 4/2011 | Lee et al. | 345/6 |
| 2011/0090343 A1* | 4/2011 | Alt et al. | 348/164 |

FOREIGN PATENT DOCUMENTS

| | | |
|---|---|---|
| JP | 2004 192623 | 7/2004 |
| JP | 2010 67090  | 3/2010 |
| JP | 2010 118019 | 5/2010 |

(Continued)

OTHER PUBLICATIONS

International Preliminary Report on Patentability Issued May 23, 2013 in PCT/JP2011/073549.

(Continued)

*Primary Examiner* — Yingchun He
(74) *Attorney, Agent, or Firm* — Oblon, McClelland, Maier & Neustadt, L.L.P.

(57) ABSTRACT

In an object display device, in the case that a marker is not detected at present, a display complementing unit acquires a change in an image in real space displayed on a display unit between the past when the marker was detected and the present. Since a virtual object is displayed based on the position and shape of the marker in the image in real space, the display position and display manner of the virtual object are also to be changed in accordance with a change in the image in real space. A display decision unit can therefore decide the display position and display manner of the virtual object at present from the display position and display manner of the virtual object in the past, based on the change in the image in real space between the past and the present.

7 Claims, 9 Drawing Sheets

(56) References Cited

FOREIGN PATENT DOCUMENTS

JP       2010 231459       10/2010
WO    WO 2009/118184 A1    10/2009

OTHER PUBLICATIONS

Written Opinion of the International Searching Authority Issued Jan. 10, 2012 in PCT/JP2011/073549 (English translation only).

International Search Report Issued Jan. 10, 2012 in PCT/JP11/73549 Filed Oct. 13, 2011.

Office Action issued on Apr. 16, 2013 in the counterpart Japanese Patent Application No. 2010-249869 (with English Translation).

Combined Office Action and Search Report issued May 29, 2015 in Chinese Patent Application No. 201180053101.X (with English language translation).

* cited by examiner

| OBJECT ID | OBJECT DATA | ASSOCIATED MARKER | OFFSET |
|---|---|---|---|
| aaa | aaa.dat | 1 | $S_1$ |
| bbb | bbb.dat | 2 | $S_2$ |
| ⋮ | ⋮ | ⋮ | ⋮ |

| FRAME NO. | ATTITUDE DATA (ORIENTATION) | ATTITUDE DATA (POSITION) | MARKER POSITION | ESTIMATED MARKER SHAPE |
|---|---|---|---|---|
| 100 | $D_0$ | $P_0$ | $M_0$ | - |
| 101 | $D_1$ | $P_1$ | $M_1$ |  |
| 102 | $D_2$ | $P_2$ | $M_2$ |  |

OBJECT DISPLAY DEVICE AND OBJECT DISPLAY METHOD

TECHNICAL FIELD

The present invention relates to an object display device and an object display method.

BACKGROUND ART

In recent years, services using AR (Augmented Reality) technology have been developed and provided. For example, a technique is known in which a predetermined marker is detected from an image in real space acquired by the camera of a mobile terminal, and a virtual object associated with the marker is overlaid on the image in real space and displayed on a display. A terminal device is also known which estimates a change in spatial positional relationship between an image capturing unit and an object to be captured, from temporally different images, and performs control, for example, on scrolling on a display based on the change (see, for example, Patent Literature 1).

CITATION LIST

Patent Literature

[Patent Literature 1] Japanese Patent Application Laid-Open Publication No. 2010-67090

SUMMARY OF INVENTION

Technical Problem

The technique of displaying a virtual object overlaid on an image in real space based on a marker detected from the image in real space captured by a camera cannot display the virtual object if the marker is not detected for some reason. When an image of a marker existing in real space is captured, the marker, although existing in a shooting range, is not detected in some cases due to various reasons such as the positional relationship between the camera and the marker, and the shooting conditions such as brightness.

The present invention is made in view of the above-mentioned problem. An object of the present invention is to provide an object display device and an object display method capable of displaying a virtual object even when a marker in real space is not detected for some reason.

Solution to Problem

In order to solve the above-mentioned problem, an object display device according to an embodiment of the present invention detects a predetermined marker from an image in real space acquired by image capturing means and overlays a virtual object associated with the marker on the image in real space to display the overlaid virtual object on display means. The object display device includes display complementing means for, in the case that the marker is not detected, acquiring a change in the image in real space displayed on the display means between the past when the marker was detected and the present, and display decision means for deciding a display position and display manner of the virtual object based on the change in the image in real space displayed on the display means and acquired by the display complementing means. The display means displays the virtual object overlaid on the image in real space based on the display position and display manner of the virtual object that are decided by the display decision means.

In order to solve the above-mentioned problem, an object display method according to an embodiment of the present invention is performed in an object display device for detecting a predetermined marker from an image in real space acquired by image capturing means and for overlaying a virtual object associated with the marker on the image in real space to display the overlaid virtual object on display means. The object display method includes a display complementing step of, in the case that the marker is not detected, acquiring a change in the image in real space displayed on the display means between the past when the marker was detected and the present, a display decision step of deciding a display position and display manner of the virtual object based on the change in the image in real space displayed on the display means and acquired in the display complementing step, and a display step of displaying the virtual object overlaid on the image in real space based on the display position and display manner of the virtual object that are decided in the display decision step.

In the object display device and the object display method according to an embodiment of the present invention, in the case that a marker is not detected at present, a change in an image in real space displayed on the display means between the past when the marker was detected and the present is acquired. Since a virtual object is displayed based on the position and shape of the marker in the image in real space, the display position and display manner of the virtual object are also to be changed in accordance with a change in the image in real space. The display position and display manner of the virtual object at present can therefore also be decided from the display position and display manner of the virtual object in the past, based on the change in the image in real space between the past and the present. Accordingly, the virtual object can be displayed even when the marker in real space is not detected for some reason.

In the object display device according to an embodiment of the present invention, the display complementing means may include particular shape recognition means for extracting a particular shape from the image in real space and recognizing a change in the shape and position of the particular shape between the past when the marker was detected and the present. A change in the image in real space displayed on the display means may be acquired based on the change in the shape and position of the particular shape that is recognized by the particular shape recognition means.

In this case, a change in the image in real space displayed on the display means is acquired based on a change in the shape and position of the particular shape extracted from the image in real space. The change in the shape and position of the particular shape is extracted from the image in real space in a similar manner as with the marker for deciding the display position and display manner of the virtual object, so that a change in the image in real space displayed on the display means is acquired accurately. Accordingly, the display position and display manner at present can be decided accurately based on the display position and display manner of the virtual object in the past.

The particular shape for acquiring a change in the image in real space displayed on the display means may be a shape of a predetermined substance. In this case, a change in the image in real space displayed on the display means can be acquired reliably.

The particular shape for acquiring a change in the image in real space displayed on the display means may be at least one of a predetermined graphic and line, and a certain region having a single color. In this case, the probability of extraction of the particular shape by the particular shape recognition means is improved.

In the object display device according to an embodiment of the present invention, the display complementing means may include terminal attitude sensing means for sensing a change in a position and shooting direction of the object display device. In the case that the display complementing means fails to acquire a change in the image displayed on the display means, the display decision means may decide the display position and display manner of the virtual object based on the change in the position and shooting direction of the object display device that is recognized by the terminal attitude sensing means.

In this case, the display position and display manner of the virtual object are decided based on a change in the position and shooting direction of the object display device, so that the virtual object can be displayed even when the particular shape is not detected from the image in real space.

In the object display device according to an embodiment of the present invention, the display decision means may estimate a position and shape of the marker in the image in real space displayed on the display means based on the change in the image in real space displayed on the display means, and may decide the display position and display manner of the virtual object based on the estimated position and shape of the marker.

In this case, the position and shape of the marker in real space which serves as a basis for deciding the display position and display manner of the virtual object are estimated based on the change in the image in real space displayed on the display means, so that the display position and display manner of the virtual object at present can be decided appropriately.

Advantageous Effects of Invention

In the AR technology, the position of a mobile terminal can be specified accurately and reliably.

DESCRIPTION OF EMBODIMENTS

An embodiment of an object display device and an object display method according to the present invention will be described with reference to the figures. It is noted that the same parts are denoted with the same reference signs, if possible, and an overlapping description is omitted.

Figure 1:
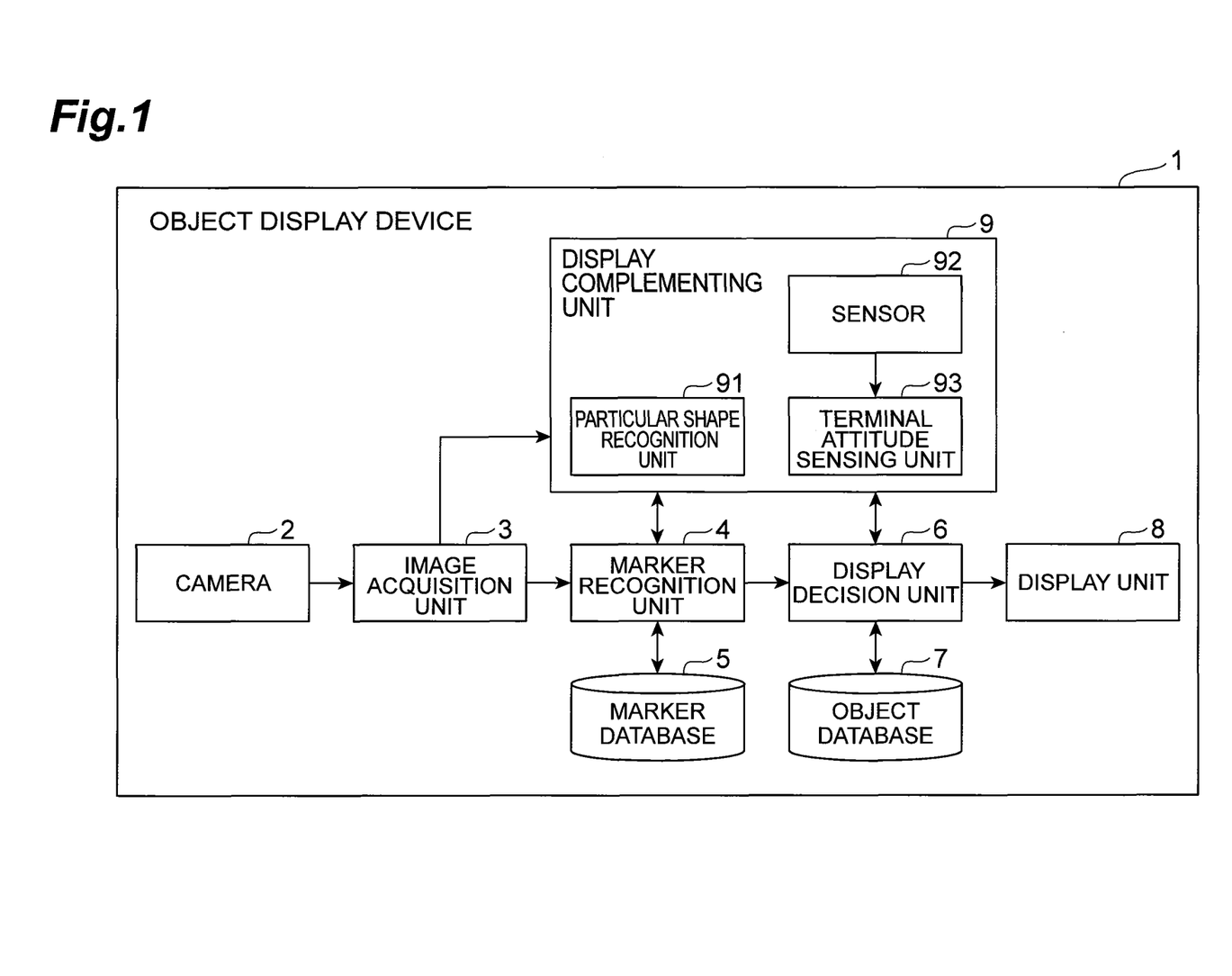
FIG. 1 is a block diagram showing a functional configuration of an object display device.

FIG. 1 is a block diagram showing a functional configuration of an object display device 1. The object display device 1 in the present embodiment is a device for detecting a predetermined marker from an image in real space acquired by image capturing means and overlays a virtual object associated with the marker on the image in real space to display the overlaid virtual object on display means.

The marker is a predetermined sign present in real space. The object display device 1 stores data of virtual objects in advance, the data which is to be displayed in association with markers. When detecting a marker from an image in real space, the object display device 1 decides the display position and display manner of a virtual object based on the shape (deformation) and size of the marker, overlays the virtual object on the image in real space in accordance with the decided display position and display manner, and allows the overlaid virtual object to appear on the display. The object display device 1 may acquire data of the virtual object via communication.

The virtual object is overlaid on an image in real space and displayed, thereby providing a variety of information to the user of the object display device 1.

Figure 2:
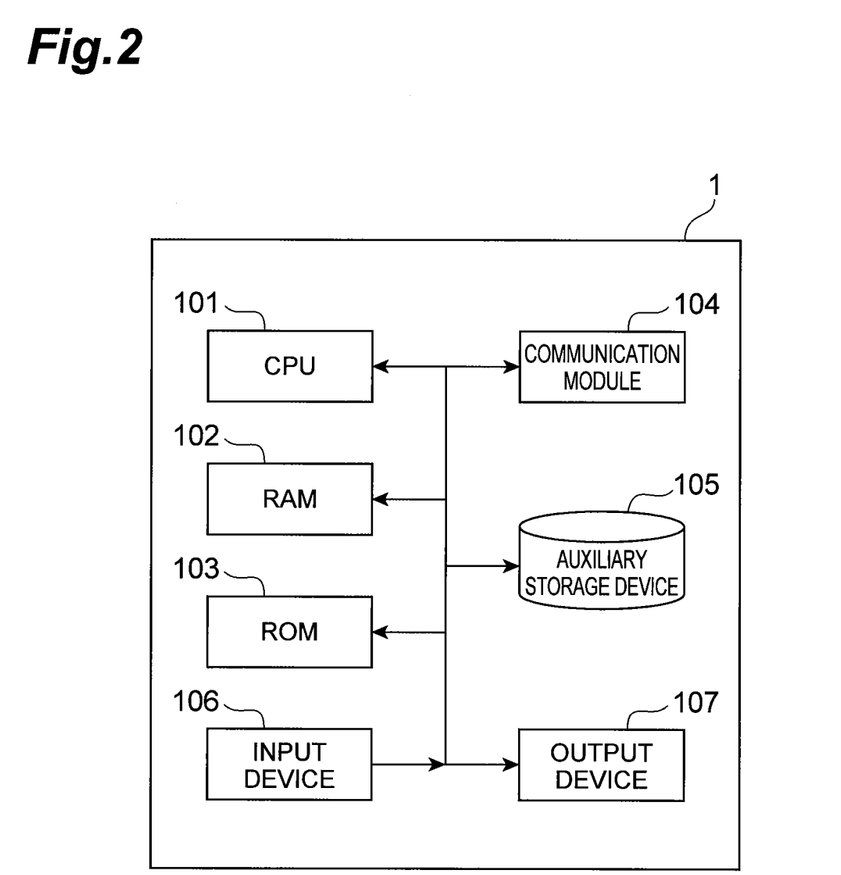
FIG. 2 is a hardware block diagram of the object display device.

As shown in FIG. 2, the object display device 1 functionally includes a camera 2 (image capturing means), an image acquisition unit 3, a marker recognition unit 4, a marker database 5, a display decision unit 6 (display decision means), an object database 7, a display unit 8 (display means), and a display complementing unit 9 (display complementing means).

FIG. 2 is a hardware configuration diagram of the object display device 1. As shown in FIG. 2, the object display device 1 is physically configured as a computer system mainly including a CPU 101, a RAM 102 and a ROM 103 as main storages, a communication module 104 that is a data transmission/reception device, an auxiliary storage device 105 such as a hard disk or a flash memory, an input device 106 such as a keyboard as an input device, and an output device 107 such as a display. Each function shown in FIG. 1 is implemented by reading predetermined computer software on the hardware such as the CPU 101 and the RAM 102 shown in FIG. 2 to bring the communication module 104, the input device 106, and the output device 107 into operation under the control of the CPU 101, and by reading and writing data from/into the RAM 102 or the auxiliary storage device 105. Referring to FIG. 1 again, each functional unit of the object display device 1 will be described in details.

The camera 2 is image capturing means for capturing an image in real space. The camera 2 sends the captured image in real space to the image acquisition unit 3. The image in real space includes still images and motion images.

The image acquisition unit 3 is a unit that acquires an image in real space captured by the camera 2. The image acquisition unit 3 sends the acquired image in real space to the marker recognition unit 4 and the display complementing unit 9.

The marker recognition unit 4 is a unit that recognizes a marker from an image in real space based on image data of the marker registered in the marker database 5. The marker is recognized, for example, by an image processing technique such as pattern matching known to those skilled in the art. More specifically, the marker recognition unit 4 extracts a marker from an image in real space and additionally recognizes the position and shape of the marker in the image in real space. The shape of the marker in the image in real space has a deformation in accordance with the positional relationship between the camera 2 and the marker, so that the orientation of the marker in the image in real space can be determined based on the shape of the marker. The marker recognition unit 4 sends information identifying the recognized marker and information about the position and shape of the marker in the image in real space to the display complementing unit 9 and the display decision unit 6.

Figure 3:
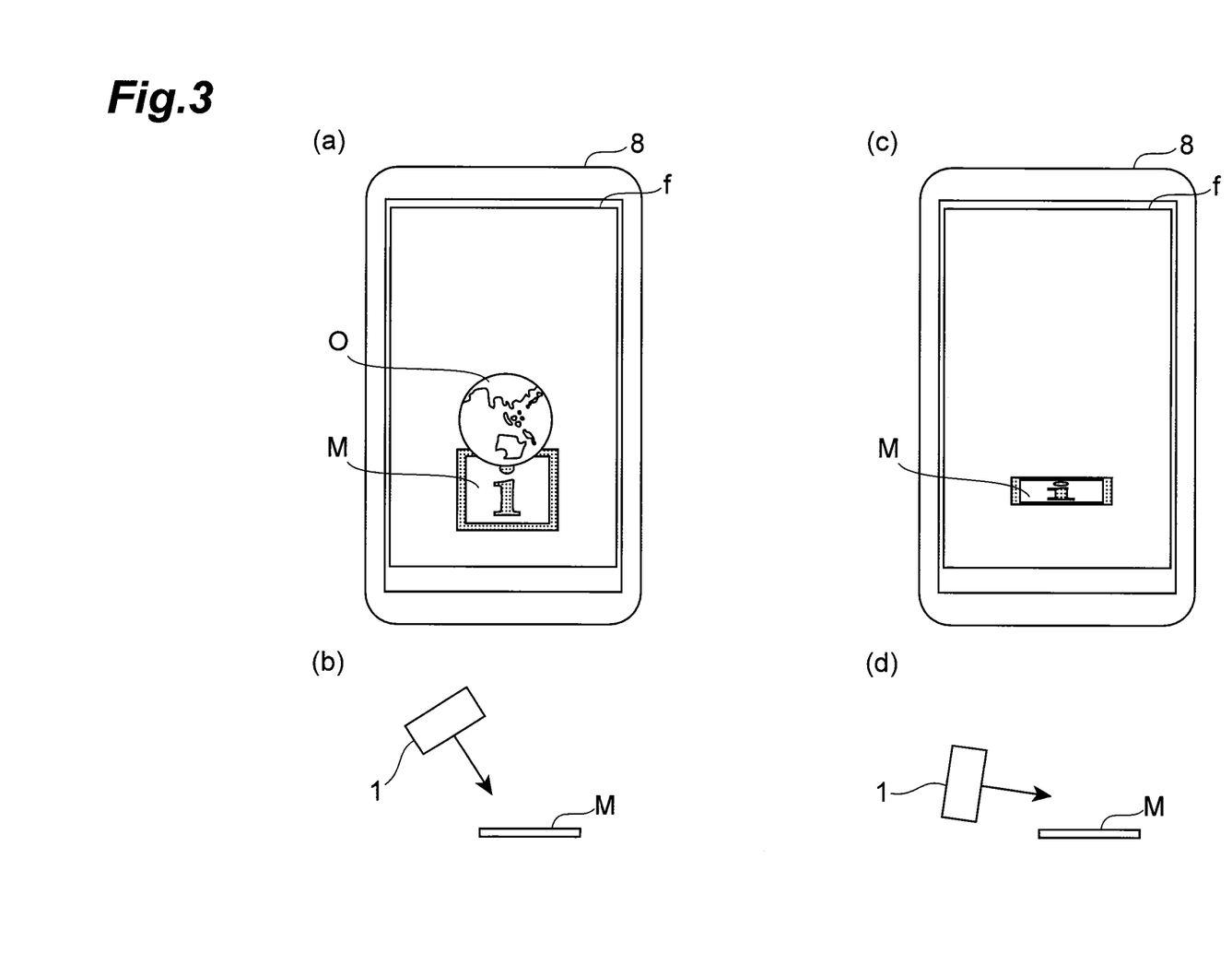
FIG. 3 is a diagram showing a display example of a virtual object based on a marker on a display unit and an example in which a virtual object cannot be displayed when a marker is not detected.

When the marker recognition unit 4 fails to recognize a marker from an image in real space, the marker recognition unit 4 sends information to that effect to the display complementing unit 9 and the display decision unit 6. FIG. 3 is a diagram showing an example in which the marker recognition unit 4 cannot recognize a marker from an image in real space.

FIG. 3(*a*) shows an example of an image f that appears on the display unit 8 when the positional relationship between the object display device 1 and a marker M is as shown in a schematic diagram in FIG. 3(*b*). The marker M in the present embodiment is a sign in which a letter "i" of the alphabet is represented on a plane. As shown in FIG. 3(*b*), the object display device 1 captures an image of the marker M from obliquely upward of the marker M, so that the marker recognition unit 4 can recognize the marker M from the image f. Once the marker M is recognized, as shown in FIG. 3(*a*), the display unit 8 overlays a virtual object O associated with the marker M on the image in real space and displays the overlaid virtual object O.

FIG. 3(*c*) is an example of the image f that appears on the display unit 8 when the positional relationship between the object display device 1 and the marker M is as shown in a schematic diagram in FIG. 3(*d*). In FIG. 3(*d*), the angle that the shooting direction for the object display device 1 to capture the image of the marker M forms with the upper surface of the marker M is small, so that, as shown in FIG. 3(*c*), the degree of deformation of the shape of the marker M in the image f captured by the camera 2 and the image acquisition unit 3 is greater than that in FIG. 3(*a*). When the degree of deformation of the shape of the marker M in the image f is great in this manner, the marker recognition unit 4 cannot recognize the marker M from the image f in real space. In this case, as shown in FIG. 3(*c*), the display unit 8 does not overlay and display the virtual object O.

Examples of possible cases where the marker recognition unit 4 cannot recognize a marker from an image in real space include, in addition to the case where the degree of deformation of the shape of the marker M is great as shown in FIGS. 3(*c*) and (*d*), a case where blown-out highlights occur due to flashing light and a case where the quantity of light for image capturing is insufficient.

Figure 4:
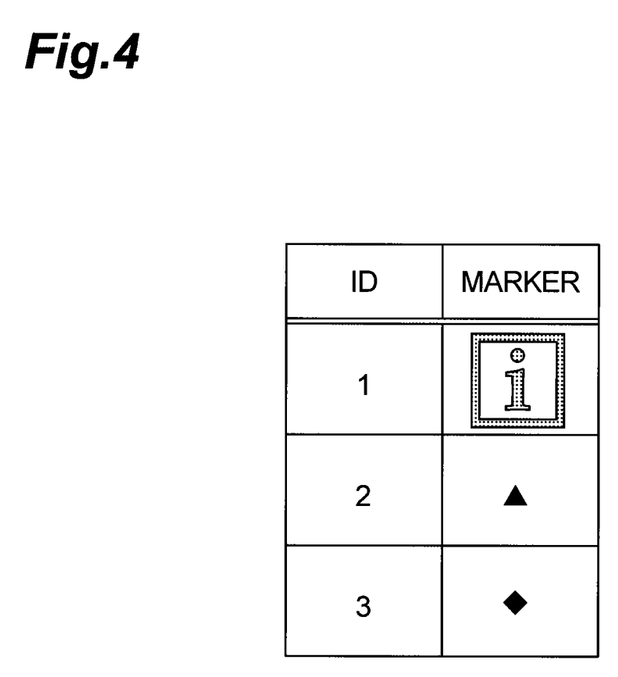
FIG. 4 is a diagram showing a configuration of a marker database and an example of data stored therein.

The marker database 5 is a database storing data of markers. Data of markers is more specifically image data of markers. FIG. 4 is a diagram showing a configuration of the marker database 5 and an example of data stored therein. As shown in FIG. 4, the marker database 5 stores the data of markers associated with respective IDs identifying the markers.

The display decision unit 6 extracts the data of a virtual object associated with the marker from the object database, based on the information identifying the marker that is sent from the marker recognition unit 4, and decides the display position and display manner of the virtual object in the image displayed on the display unit, based on the information about the position and shape of the marker that is sent from the marker recognition unit 4.

The display position and display manner of the virtual object are defined based on the relative positional relationship to the marker associated with the virtual object. In the present embodiment, the positional relationship between the virtual object and the marker is stored as an offset in the object database 7 as described later. The data of the offset includes, for example, information indicating the relative position of the virtual object with reference to the position of the marker, and information about the orientation of the virtual object when displayed.

The display decision unit 6 sends the information about the display position and display manner of the virtual object (including the information about the orientation) and the image data of the virtual object to the display unit 8.

When a marker is not detected, the display decision unit 6 acquires a change in the image in real space displayed on the display unit 8 between the past when the marker was detected and the present from the display complementing unit 9, and decides the display position and display manner of the virtual object in the image displayed on the display unit, based on the acquired change in the image in real space. The details of processing of deciding the display position and display manner of a virtual object in the case where a marker is not detected will be described later.

Figure 5:
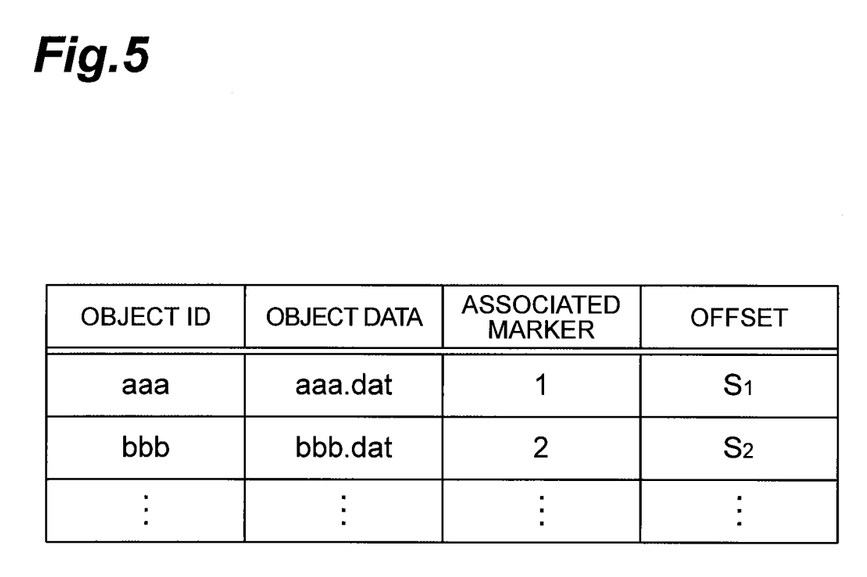
FIG. 5 is a diagram showing a configuration of an object database and an example of data stored therein.

The object database 7 is a database storing data concerning virtual objects. FIG. 5 is a diagram showing a configuration of the object database 7 and an example of data stored therein. As shown in FIG. 5, the object database 7 stores object data, associated markers, and offsets which are associated with respective object IDs identifying virtual objects. The object data is image data of a virtual object. The associated marker is an ID of a marker displayed in associated with the virtual object. The offset is data showing the positional relation to the marker when the virtual object overlaid on an image in real space is displayed.

The display unit 8 is a unit that displays a virtual object overlaid on an image in real space based on the display position and display manner of the virtual object that are decided by the display decision unit 6. The display unit 8 is configured, for example, with a device such as a display.

The display complementing unit 9 is a unit that acquires a change in the image in real space displayed on the display unit 8 between the past when a marker was detected and the present, in the case where the marker is not detected. The display complementing unit 9 includes a particular shape recognition unit 91 (particular shape recognition means), a sensor 92, and a terminal attitude sensing unit 93 (terminal attitude sensing means).

Specifically, the particular shape recognition unit 91 extracts a predetermined particular shape from an image in real space and recognizes a change in the shape and position of the particular shape between the past when the marker was detected and the present. More specifically, the particular shape recognition unit 91 stores the shape and position of the particular shape in the past when the marker was detected, into a predetermined memory, and, if the marker is not recognized at present, compares the shape and position of the particular shape acquired from the image in real space at present with the shape and position of the particular shape in the immediate past when the marker was detected, thereby recognizing the change therebetween.

The display complementing unit 9 then acquires a change in the image in real space displayed on the display unit 8 based on the change in the shape and position of the particular shape that is recognized by the particular shape recognition unit 91, and sends information about the acquired change in the image in real space to the display decision unit 6.

Figure 6:
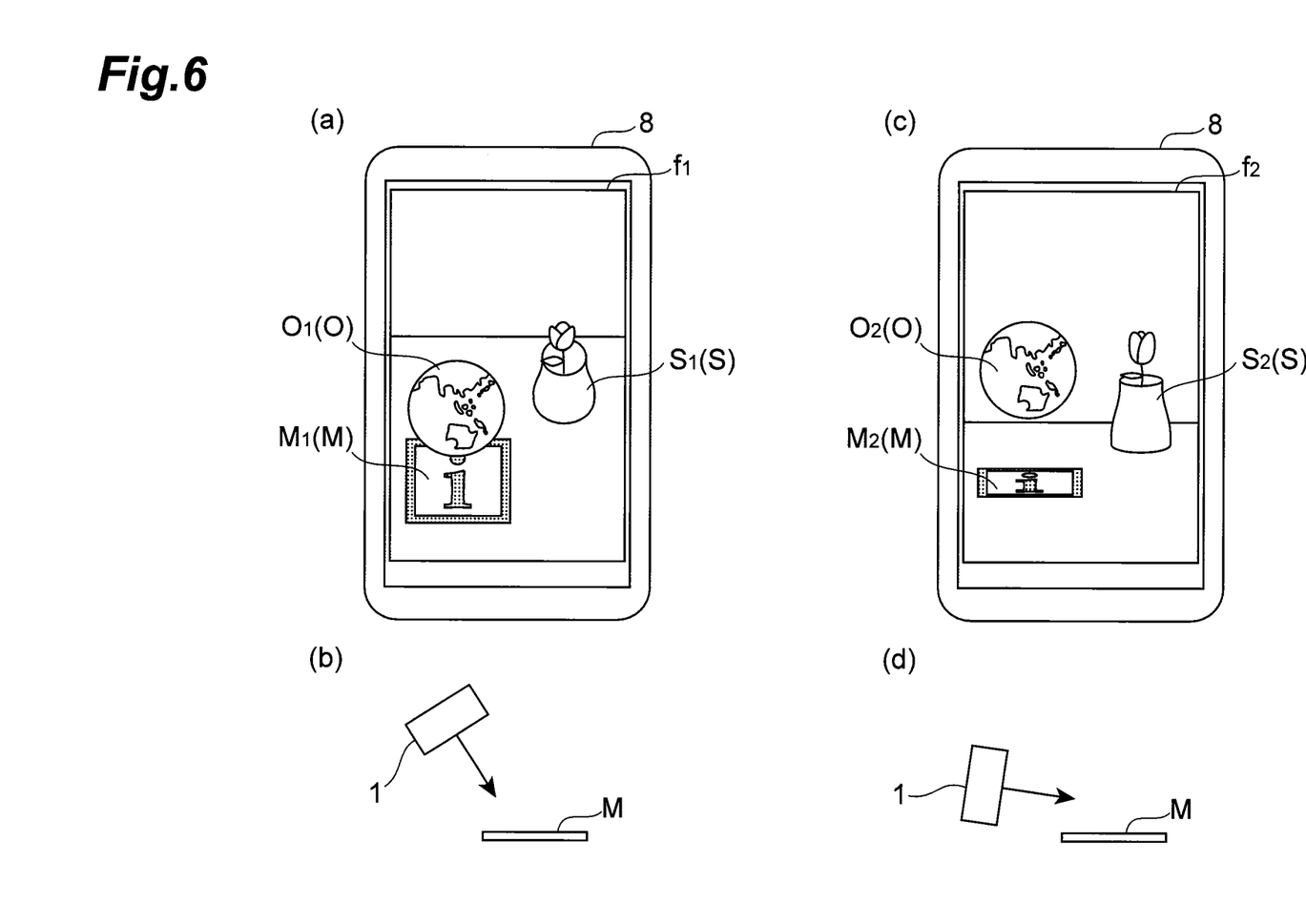
FIG. 6 is a diagram schematically showing a positional relationship between the object display device and the marker and showing examples of a display image in such a relationship.

Referring now to FIG. 6, a process of displaying an overlaid virtual object based on the extracted particular shape is described in details.

FIG. 6(a) shows an example of an image $f_1$ that appears on the display unit 8 when the positional relationship between the object display device 1 and the marker M is as shown in a schematic diagram in FIG. 6(b). As shown in FIG. 6(b), the object display device 1 captures an image of the marker M from obliquely upward of the marker M. The angle that the shooting direction for capturing an image of the marker M from the object display device 1 forms with the upper surface of the marker M is large, so that the marker recognition unit 4 can recognize the marker $M_1$ from the image $f_1$ in the example shown in FIG. 6(a). In this case, the display decision unit 6 extracts the virtual object O associated with the marker M recognized by the marker recognition unit 4 from the object database 7, decides the display position and display manner of the virtual object O based on the position and shape of the marker $M_1$, and allows the display unit 8 to display the overlaid virtual object $O_1$ associated with the marker $M_1$.

FIG. 6(c) shows an example of the image $f_1$ that appears on the display unit 8 when the positional relationship between the object display device 1 and the marker M is as shown in a schematic diagram in FIG. 6(d). As shown in FIG. 6(d), the angle that the shooting direction for capturing an image of the marker M from the object display device 1 forms with the upper surface of the marker M is small, so that, as shown in FIG. 6(c), the degree of deformation of the shape of the marker $M_2$ in an image $F_2$ displayed on the display unit 8 is greater than in FIG. 6(a). When the degree of deformation of the shape of the marker M in the image f is great in this manner, the marker recognition unit 4 cannot recognize the marker $M_2$. In this case, the marker recognition unit 4 sends information indicating that the marker is not recognized to the display complementing unit 9 and the display decision unit 6.

When acquiring the information indicating that the marker is not recognized, the particular shape recognition unit 91 of the display complementing unit 9 extracts a particular shape S from the image f and recognizes a change in the shape and position between the particular shape $S_1$ in the image $f_1$ (FIG. 6(a)) in the past when the marker was detected and the particular shape $S_2$ in the image $f_2$ at present. The display complementing unit 9 sends the change in the shape and position of the particular shape S that is recognized by the particular shape recognition unit 91, as information about a change in the image in real space, to the display decision unit 6.

The display decision unit 6 estimates the position and shape of the marker $M_2$ in the image $f_2$ at present based on the information about a change in the image in real space that is sent from the display complementing unit 9, as well as the position and shape of the marker $M_1$ in the image $f_1$ in the past when the marker M was detected. The display decision unit 6 then decides the display position and display manner of the virtual object $O_2$ based on the estimated position and shape of the marker $M_2$. More specifically, the display decision unit 6 estimates a relative change in the position and shape of the marker M between the images $f_1$ and $f_2$ based on a relative change in the position and shape between the particular shape $S_1$ in the image $f_1$ in the past and the particular shape $S_2$ in the image $f_2$ at present.

In the example shown in FIG. 6, the particular shape recognition unit 91 extracts the shape of a vase as a particular shape S. The target recognized as a particular shape S is not limited to the shape of such an object. For example, the particular shape S may be the shape of a predetermined substance. Any substance that can be recognized by an image recognition technique known to those skilled in the art can be employed. Predetermined substances such as a logotype, a sign, a face, and a table can be employed. The particular shape S may be at least one of a predetermined graphic and line, and a certain region having a single color. Examples of such a particular shape S include a quadrature, a vertical line and a horizontal line, and a grid pattern formed with horizontal lines and vertical lines that are present in the image. For example, data about the particular shape S may be stored in advance in predetermined storage means in the object display device 1. As long as the particular shape S can be recognized as a predetermined feature point by an image recognition technique known to those skilled in the art, data about the particular shape S may not be retained in advance in storage means.

The particular shape recognition unit 91 carries out a determination process as to whether a particular shape for acquiring a change in the image in real space can be extracted from the image acquired by the image acquisition unit 3, prior to the process of recognizing a change in the shape and position of the particular shape S.

Figure 7:
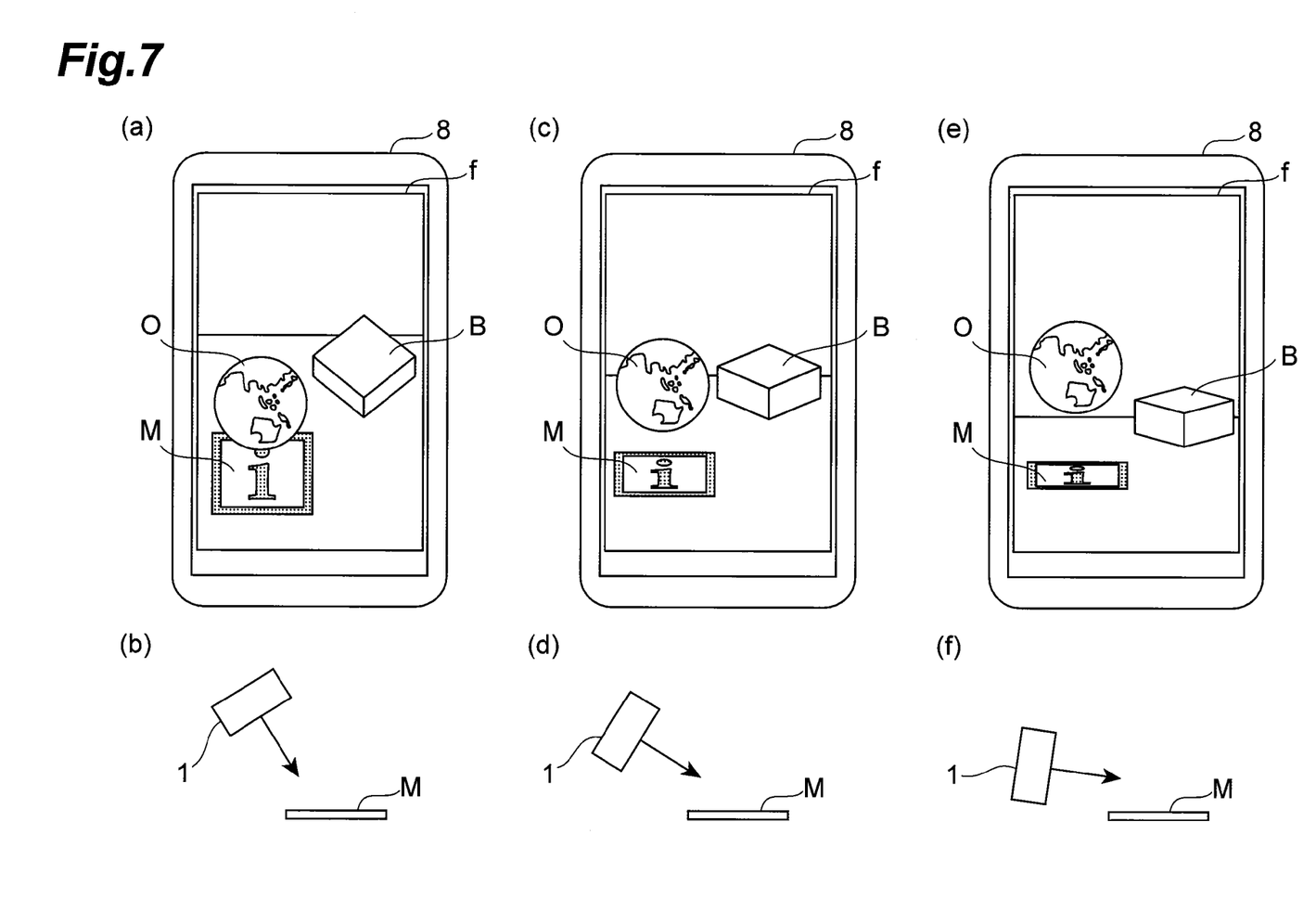
FIG. 7 is a diagram showing display examples of a virtual object based on a change in a particular shape and a change in a marker shape on the display unit.

Referring now to FIG. 7, a process of overlaying a virtual object based on learning information acquired from changes of the particular shape and the shape of the marker will be described as a variation to the process described with reference to FIG. 6.

FIG. 7(a) shows an example of the image f that appears on the display unit 8 when the positional relationship between the object display device 1 and the marker M is as shown in a schematic diagram in FIG. 7(b). As shown in FIG. 7(b), the object display device 1 captures an image of the marker M from obliquely upward of the marker M. The angle that the shooting direction for capturing an image of the marker M from the object display device 1 forms with the upper surface of the marker M is large, so that the marker recognition unit 4 can recognize the marker M from the image f in the example shown in FIG. 7(a). Once the marker M is recognized, the display decision unit 6 extracts the virtual object O associated with the marker M recognized by the marker recognition unit 4 from the object database 7, decides the display position and display manner of the virtual object O based on the position and shape of the marker M, and allows the display unit 8 to display the overlaid virtual object O associated with the marker M.

FIG. 7(c) shows an example of the image f that appears on the display unit 8 when the positional relationship between the object display device 1 and the marker M is as shown in a schematic diagram in FIG. 7(d). In FIG. 7(d), the angle that the shooting direction for the object display device 1 to capture an image of the marker M forms with the upper surface of the marker M is slightly smaller than that in FIG. 7(b), so that, as shown in FIG. 7(c), the degree of deformation of the shape of the marker M in the image f captured by the camera 2 and the image acquisition unit 3 is greater than in FIG. 7(a). However, supposing the marker recognition unit 4 can recognize the marker M with the degree of deformation shown in FIG. 7(c), the display decision unit 6 decides the display position and display manner of the virtual object O based on the recognized marker M and allows the display unit 8 to display the overlaid virtual object O based on the decided display position and display manner.

Here, the marker recognition unit 4 acquires a change in the position and shape of the marker M during transition of display from the image f shown in FIG. 7(a) to the image f shown in FIG. 7(c) and sends information about the acquired change in the position and shape of the marker M to the display decision unit 6. The particular shape recognition unit 91 extracts and recognizes a particular shape B from the image f shown in FIGS. 7(a) and (c) as an object shaped like a rectangular parallelepiped. The particular shape recognition unit 91 then acquires a change in the position and shape of the particular shape B during transition of display from the image f shown in FIG. 7(a) to the image f shown in FIG. 7(c) and sends information about the acquired change in the position and shape of the particular shape B to the display decision unit 6.

The display decision unit 6 acquires the information about the change in the position and shape of the marker M during transition of display from the image f shown in FIG. 7(a) to the image f shown in FIG. 7(c) from the marker recognition unit 4 and also acquires the information about the change in the position and shape of the particular shape B from the particular shape recognition unit 91. The display decision unit 6 then acquires the change in the position and shape of the marker M corresponding to the change in the position and shape of the particular shape B as learning information and stores the acquired learning information into a predetermined memory. When the marker recognition unit 4 cannot recognize the marker M, the display decision unit 6 can estimate the position and shape of the marker M based on the learning information about the respective positions and shapes of the particular shape B and the marker M.

More specifically, when the positional relationship between the object display device 1 and the marker M is as shown in a schematic diagram in FIG. 7(f), the angle that the shooting direction for the object display device 1 to capture the marker M forms with the upper surface of the marker M is very small, so that the degree of deformation of the shape of the marker M in the image f is great as shown in FIG. 7(e). The marker recognition unit 4 therefore cannot recognize the marker M. Even in the positional relationship shown in FIG. 7(f), the particular shape recognition unit 91 can recognize the particular shape B. The particular shape recognition unit 91 thus sends the position and shape of the particular shape B in the image f shown in FIG. 7(e) to the display decision unit 6. The display decision unit 6 then estimates the position and shape of the marker M in FIG. 7(e) based on the position and shape of the particular shape B in FIG. 7(e) and the learning information about the respective positions and shapes of the particular shape B and the marker M. The display decision unit 6 decides the display position and display manner of the virtual object O based on the estimated position and shape of the marker M and allows the display unit 8 to display the virtual object O.

Referring again to FIG. 2, the function of the terminal attitude sensing unit 93 is described. The terminal attitude sensing unit 93 senses a change in the position and shooting direction of the object display device 1 based on a variety of information acquired from the sensor 92. Examples of the sensor 92 include sensors such as an accelerometer sensor and a geomagnetic sensor. Information about acceleration and the direction of geomagnetism acquired by those sensors is sent to the terminal attitude sensing unit 93. When the display complementing unit 9 cannot acquire a change in the image displayed on the display unit 8, the display decision unit 6 decides the display position and display manner of the virtual object based on the change in the position and shooting direction of the object display device 1 that is recognized by the terminal attitude sensing unit 93.

Figure 8:
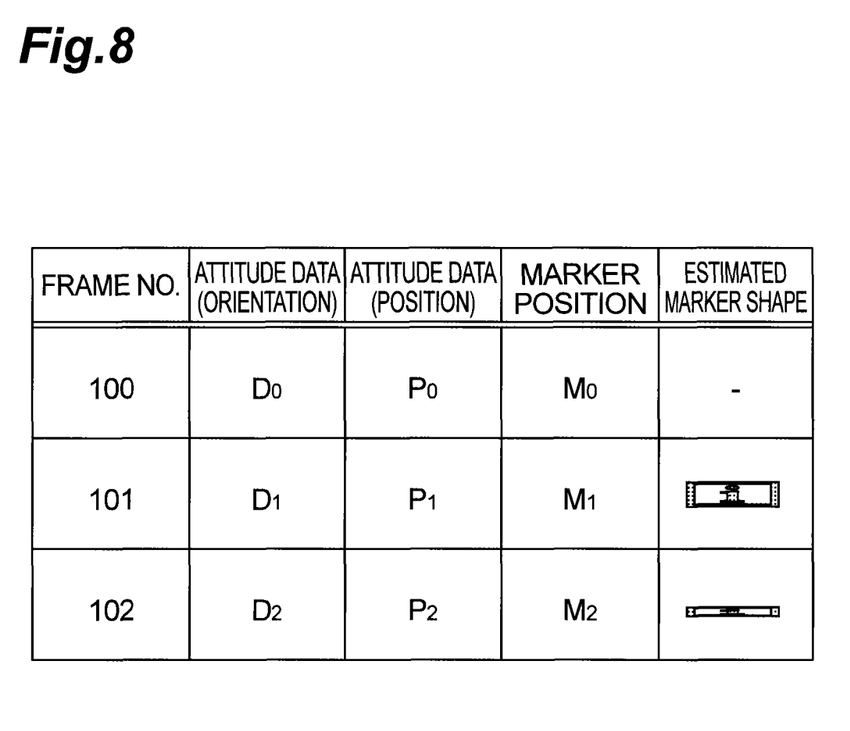
FIG. 8 is a diagram showing an example of the attitude data of the object display device, and data of a marker position and an estimated marker shape for each frame.

Referring to FIG. 8, the processing by the terminal attitude sensing unit 93 is specifically described. FIG. 8 is a diagram showing an example of a table in which attitude data, a marker position, and an estimated marker shape are associated for each frame in the image displayed on the display unit 8.

The frame No. in FIG. 8 is data identifying a frame. The attitude data (orientation) is data indicating the orientation of the object display device 1 at the point of time when the image of the corresponding frame is acquired. The attitude data (orientation) "$D_0$" at the point of time when the image of the frame No. "100" is acquired is set as an initial state, and differential values from the data "$D_0$" indicating the orientation are stored as "$D_1$" and "$D_2$". The attitude data (orientation) can be represented, for example, by the rotation angle with respect to each axis in a predetermined three-dimensional coordinate system.

The attitude data (position) is data indicating the position of the object display device 1 at the point of time when the image of the corresponding frame is acquired. The attitude data (position) at the point of time when the image of the frame No. "100" is acquired is set as an initial state, and differential values from the data "$P_0$" indicating the orientation are stored as "$P_1$" and "$P_2$". The terminal attitude sensing unit 93 sends the attitude data (orientation) and the attitude data (position) to the display decision unit 6. The attitude data (position) can be represented, for example, by coordinate values in a predetermined three-dimensional coordinate system.

The marker position in the table shown in FIG. 8 is data indicating the display position of the marker at the point of time when the image of the corresponding frame is acquired. The marker position is represented, for example, by a predetermine coordinate system set in the display region of the display unit 8. The estimated marker shape is the marker shape displayed on the display unit 8 that is estimated by the display decision unit 6.

The display decision unit 6 estimates the marker position based on the attitude data (orientation) and the attitude data (position). Specifically, the display decision unit 6 can estimate the marker position "$M_1$" based on the attitude data (orientation) "$D_1$" and the attitude data (position) "$P_1$" as well as the marker position "$M_0$". Similarly, the display decision unit 6 can estimate the marker position "$M_2$" based on the attitude data (orientation) "$D_2$" and the attitude data (position) "$P_2$" as well as the marker position "$M_1$".

The display decision unit 6 can calculate the deformation of the shape of the marker displayed on the display unit 8 based on the attitude data (orientation) and the attitude data (position) and can estimate the estimated marker shape.

The display decision unit 6 can determine whether a marker exists in a range of angle of view of the display unit 8 by estimating the marker position shown in the table in FIG. 8 when the marker recognition unit 4 cannot recognize the marker. This determination process is implemented, for example, by determining whether the coordinate values of the marker position are within a predetermined range of values. Accordingly, when it is determined that a marker does not exist in the range of angle of view of the display unit 8, control can be performed such that the process for displaying an overlaid virtual object is omitted.

Figure 9:
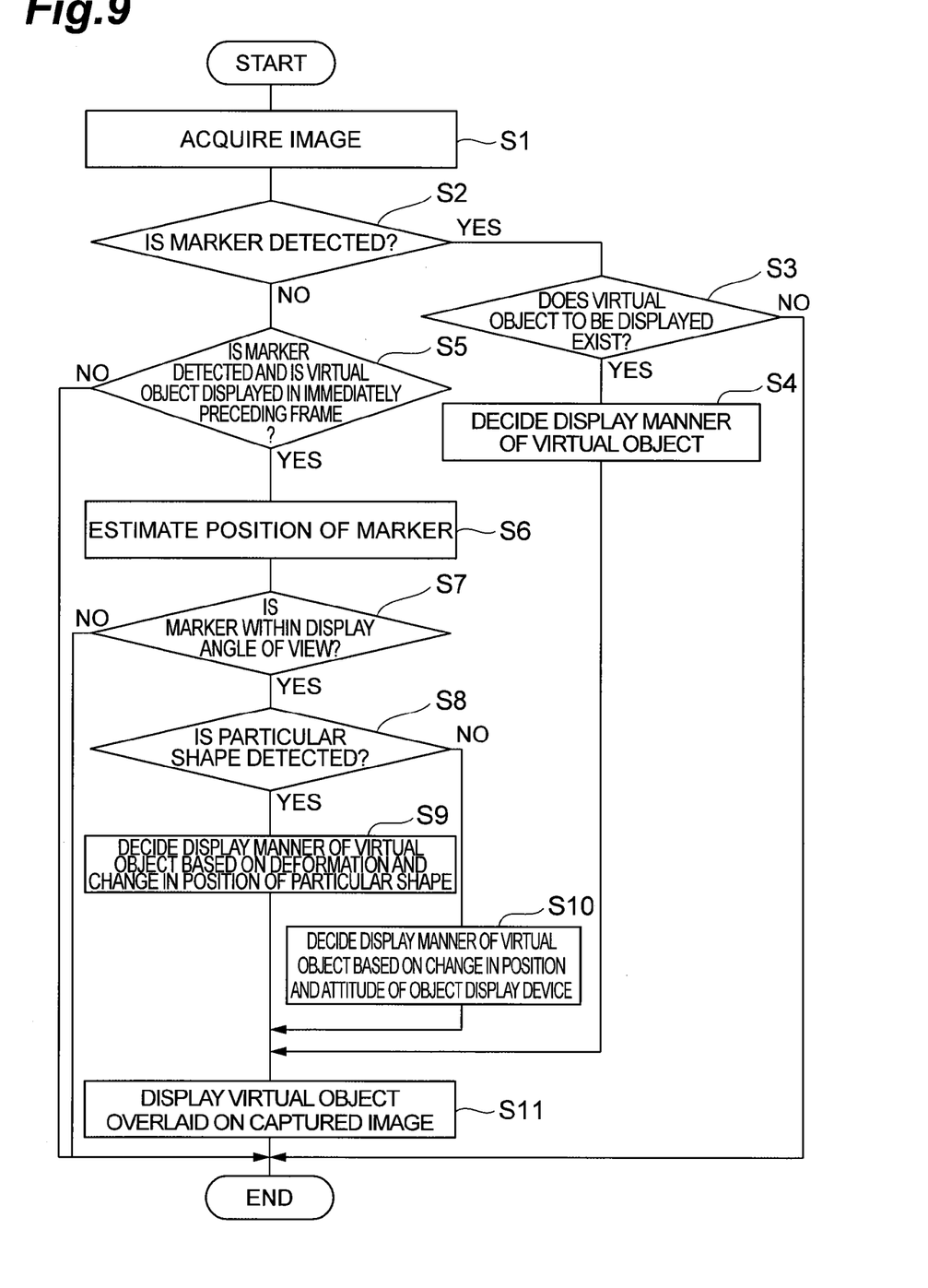
FIG. 9 is a flowchart showing processing of an object display method.

Referring now to FIG. 9, an example of operation of the object display device 1 in the object display method in the present embodiment is described. FIG. 9 is a flowchart showing processing carried out in the object display device 1.

First, the image acquisition unit 3 acquires an image in real space captured by the camera 2 (S1). The marker recognition unit 4 then attempts to detect a marker from the image in real space based on image data of the marker registered in the marker database 5 (S2). If a marker is detected, the marker recognition unit 4 sends information identifying the recognized marker and information about the position and shape of the marker in the image in real space to the display decision unit 6. The process procedure then proceeds to step S3.

In step S3, the display decision unit 6 searches the object database 7 based on the information identifying the marker that is sent from the marker recognition unit 4, and determines whether there exists a virtual object to be displayed in association with the marker (S3). If it is not determined that there exists a virtual object to be displayed in association with the marker, the process procedure ends. If it is determined that there exists a virtual object to be displayed in association with the marker, the process procedure proceeds to step S4.

In step S4, the display decision unit 6 extracts data of the virtual object associated with the marker from the object database and decides the display position and display manner of the virtual object in the image displayed on the display unit, based on the information about the position and shape of the marker that is sent from the marker recognition unit 4 (S4).

By contrast, if no marker was detected in step S2, the marker recognition unit 4 sends information to that effect to the display complementing unit 9 and the display decision unit 6. The process procedure then proceeds to step S5. In step S5, the marker recognition unit 4 determines whether a marker is detected and a virtual object is displayed in the frame displayed on the display unit 8 immediately before then (S5). If it is determined that a marker is detected and a virtual object is displayed, the process procedure proceeds to step S6. If it is not determined that a marker is detected and a virtual object is displayed, the process procedure ends.

In step S6, the terminal attitude sensing unit 93 of the display complementing unit 9 senses a change in the position and shooting direction of the object display device 1 based on a variety of information acquired from the sensor 92. The position and shooting direction of the object display device 1 is illustrated, for example, by the attitude data (position) and the attitude data (orientation) in FIG. 8.

The display decision unit 6 then estimates the position of the marker at present in the image of real space displayed on the display unit 8, based on the change in the position and shooting direction of the object display device 1 and the position of the marker in the immediately preceding frame (S6). The display decision unit 6 then determines whether there exists a marker within the range of angle of view of the display unit 8 (S7). If it is determined that there exists a marker within the range of angle of view, the process procedure proceeds to step S8. If it is not determined that there exists a maker within the range of angle of view, the process procedure ends. The processing in steps S6 and S7 is not essential in the present embodiment.

In step S8, the particular shape recognition unit 91 of the display complementing unit 9 attempts to detect a predetermined particular shape from the image in real space (S8, the display complementing step). If a particular shape is detected, the process procedure proceeds to step S9. If a particular shape is not detected, the process procedure proceeds to step S10.

In step S9, the particular shape recognition unit 91 recognizes a change (deformation) and a change in the position of the particular shape between the immediately preceding frame and the present frame. The display complementing unit 9 then acquires a change in the image in real space displayed on the display unit 8 based on the change in the shape and position of the particular shape that is recognized by the particular shape recognition unit 91, and sends information about the acquired change in the image in real space to the display decision unit 6 (the display complementing step). The display decision unit 6 then estimates the position and shape of the marker in the present frame based on the information about the change in the image in real space that is sent from the image complementing unit 9, and the position and shape of the marker in the frame in the past when the marker was detected. The display decision unit 6 then decides the display position and display manner of the virtual object based on the estimated position and shape of the marker (S9, the display decision step).

In step S10, the terminal attitude sensing unit 93 acquires a change in the position and attitude of the object display device 1 between the present and the time of image acquisition in the frame in the past when the marker was detected. The display decision unit 6 then estimates the position and shape of the marker in the present frame based on the change in the position and attitude of the object display device 1 as well as the position and shape of the marker in the frame in the past when the marker was detected. The display decision unit 6 then decides the display position and display manner of the virtual object based on the estimated position and shape of the marker (S10).

In step S11, the display decision unit 6 allows the display unit 8 to display an image in which the virtual object is overlaid on the captured image in real space based on the decided display position and display manner of the virtual object (S11). The process in the present embodiment thus ends.

In the object display device 1 and the object display method in the present embodiment as described above, when a marker is not detected at present, a change in the image in real space displayed on the display unit 8 between the past when the marker was detected and the present is acquired. Since the virtual object is displayed based on the position and shape of the marker in the image in real space, the display position and display manner of the virtual object are also to be changed in accordance with a change in the image in real space. The display decision unit 6 can therefore decide the display position and display manner of the virtual object at present from the display position and display manner of the virtual object in the past, based on the change in the image in real space between the past and the present. Accordingly, even when the marker in real space is not detected for some reason, the virtual object can be displayed.

In the object display device 1 in the present embodiment, the particular shape recognition unit 91 of the display complementing unit 9 acquires a change in the image in real space displayed on the display unit 8 based on a change in the shape and position of the particular shape extracted from the image in real space. The change in the shape and position of the particular shape is extracted from the image in real space in a similar manner as with the marker for deciding the display position and display manner of the virtual object, so that a change in the image in real space displayed on the display unit 8 is acquired accurately. Accordingly, the display decision unit 6 can decide the display position and display manner accurately based on the display position and display manner of the virtual object in the past.

In the object display device 1 in the present embodiment, the terminal attitude sensing unit 93 of the display complementing unit 9 acquires a change in the position and shooting direction of the object display device 1. In addition, the display complementing unit 9 acquires a change in the image in real space displayed on the display unit 8. Accordingly, even when the particular shape recognition unit 91 fails to extract a particular shape from the image in real space, the display complementing unit 9 can acquire a change in the image in real space displayed on the display unit 8.

In the object display device 1 in the present embodiment, the display decision unit 6 estimates the position and shape of the marker in real space which serves as a basis for deciding the display position and display manner of the virtual object, based on the change in the image in real space displayed on the display unit 8. Accordingly, the display position and display manner of the virtual object at present can be decided appropriately.

The present invention has been described in details above based on an embodiment thereof. However, the present invention is not limited to the foregoing embodiment. The present invention is susceptible to various modifications in a range that does not deviate from the spirit of the invention.

INDUSTRIAL APPLICABILITY

The present invention allows a virtual object to be displayed even when a marker in real space is not detected for some reason, in services using the AR technology.

REFERENCE SIGNS LIST

1 . . . object display device, 2 . . . camera, 3 . . . image acquisition unit, 4 . . . marker recognition unit, 5 . . . marker database, 6 . . . display decision unit, 7 . . . object database, 8 . . . display unit, 9 . . . display complementing unit, 91 . . . particular shape recognition unit, 92 . . . sensor, 93 . . . terminal attitude sensing unit, S, B . . . particular shape, M . . . marker, O . . . virtual object.

The invention claimed is:

1. An object display device for detecting a predetermined marker from an image in real space acquired by an image capturing device and for overlaying a virtual object associated with the marker on the image in real space to display the overlaid virtual object on a display, the object display device comprising:
   circuitry configured to
   in the case that the marker is not detected, acquire a change in the image in real space displayed on the display between the past when the marker was detected and the present; and
   decide a display position and display manner of the virtual object based on the acquired change in the image in real space displayed on the display, wherein
   the display displays the virtual object overlaid on the image in real space based on the decided display position and display manner of the virtual object,
   wherein the circuitry estimates a position and shape of the marker in the image in real space displayed on the display based on the change in the image in real space displayed on the display, and the circuitry decides the display position and display manner of the virtual object based on the estimated position and shape of the marker.

2. The object display device according to claim 1, wherein the circuitry is configured to extract a particular shape from the image in real space, the particular shape being separate from the marker, and recognize a change in the shape and position of the particular shape between the past when the marker was detected and the present, and a change in the image in real space displayed on the display is acquired based on the recognized change in the shape and position of the particular shape.

3. The object display device according to claim 2, wherein the particular shape is a shape of a predetermined substance.

4. The object display device according to claim 2, wherein the particular shape is at least one of a predetermined graphic and line, and a certain region having a single color.

5. The object display device according claim 1, wherein
   the circuitry is configured to sense a change in a position and shooting direction of the object display device, and
   in the case that the circuitry fails to acquire a change in the image displayed on the display, the circuitry decides the display position and display manner of the virtual object based on the sensed change in the position and shooting direction of the object display device.

6. An object display method performed in an object display device for detecting a predetermined marker from an image in real space acquired by an image capturing device and for overlaying a virtual object associated with the marker on the image in real space to display the overlaid virtual object on a display, the object display method comprising:
   in the case that the marker is not detected, acquiring a change in the image in real space displayed on the display between the past when the marker was detected and the present;
   deciding a display position and display manner of the virtual object based on the acquired change in the image in real space displayed on the display; and
   displaying the virtual object overlaid on the image in real space based on the decided display position and display manner of the virtual object,
   wherein the method includes estimating a position and shape of the marker in the image in real space displayed on the display based on the change in the image in real space displayed on the display, and the deciding includes deciding the display position and display manner of the virtual object based on the estimated position and shape of the marker.

7. A non-transitory computer readable medium for storing therein a computer program that includes instructions which when executed on an object display device, for detecting a predetermined marker from an image in real space acquired by an image capturing device and for overlaying a virtual object associated with the marker on the image in real space to display the overlaid virtual object on a display, causes the object display device to perform a method comprising:
   in the case that the marker is not detected, acquiring a change in the image in real space displayed on the display between the past when the marker was detected and the present;
   deciding a display position and display manner of the virtual object based on the acquired change in the image in real space displayed on the display; and
   displaying the virtual object overlaid on the image in real space based on the decided display position and display manner of the virtual object,
   wherein the method includes estimating a position and shape of the marker in the image in real space displayed on the display based on the change in the image in real space displayed on the display, and the deciding includes deciding the display position and display manner of the virtual object based on the estimated position and shape of the marker.

* * * * *